US012621425B2

(12) United States Patent
Nishimoto et al.

(10) Patent No.: US 12,621,425 B2
(45) Date of Patent: May 5, 2026

(54) DETECTION SYSTEM

(71) Applicant: Japan Display Inc., Tokyo (JP)

(72) Inventors: Takuya Nishimoto, Tokyo (JP); Koji Yoshida, Tokyo (JP); Makoto Ishikawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/822,825

(22) Filed: Sep. 3, 2024

(65) Prior Publication Data

US 2025/0080712 A1 Mar. 6, 2025

(30) Foreign Application Priority Data

Sep. 5, 2023 (JP) ................................. 2023-143971

(51) Int. Cl.
*H04N 13/31* (2018.01)
*G06F 3/044* (2006.01)
*H04N 13/398* (2018.01)

(52) U.S. Cl.
CPC ........... *H04N 13/31* (2018.05); *G06F 3/0448* (2019.05); *H04N 13/398* (2018.05)

(58) Field of Classification Search
CPC .... H04N 13/31; H04N 13/398; G06F 3/0448; G06F 3/0412; G02B 30/30
See application file for complete search history.

(56) References Cited

U.S. PATENT DOCUMENTS 11,543,917 B2 * 1/2023 Kono ...................... G02F 1/133
2019/0104299 A1 * 4/2019 Yuuki .................. H04N 13/376

FOREIGN PATENT DOCUMENTS

JP 2010204406 A 9/2010

* cited by examiner

*Primary Examiner* — Howard D Brown, Jr.
(74) *Attorney, Agent, or Firm* — Maier & Maier, PLLC

(57) ABSTRACT

A detection system includes a display panel configured to display an image using light from a back surface side, a backlight configured to irradiate the display panel with light from the back surface side, a parallax barrier having a plurality of openings and disposed at a position overlapping the display panel, a sensor region having a detection region and disposed on a back surface of a front plate, a plurality of electrodes provided in the detection region, and a decorative layer having translucency and provided at a position overlapping the detection region and the parallax barrier.

4 Claims, 11 Drawing Sheets

FIG.11

DETECTION SYSTEM

CROSS-REFERENCE TO RELATED APPLICATION

This application claims the benefit of priority from Japanese Patent Application No. 2023-143971 filed on Sep. 5, 2023, the entire contents of which are incorporated herein by reference.

BACKGROUND

1. Technical Field

The present disclosure relates to a detection system.

2. Description of the Related Art

Conventionally known are display devices that display stereoscopic images without requiring special glasses by a parallax barrier or other mechanisms (e.g., Japanese Patent Application Laid-open Publication No. 2010-204406 (JP-A-2010-204406)).

In the technique described in JP-A-2010-204406, the display panel itself may possibly be visually recognized if an observer looks through the parallax barrier when the display device is in a non-display state. Therefore, it is desired to make the display panel itself invisible when the display device is in the non-display state. It is also desired to detect an external proximity object near the region of a stereoscopic image when the display device displays a display object (stereoscopic image).

An object of the present disclosure is to provide a detection system that can make a display panel invisible when a display device is in a non-display state and can detect an external proximity object near the region of a display object when the display device displays a stereoscopic image.

SUMMARY

A detection system according to an embodiment of the present disclosure includes a display panel configured to display an image using light from a back surface side, a backlight configured to irradiate the display panel with light from the back surface side, a parallax barrier having a plurality of openings and disposed at a position overlapping the display panel, a sensor region having a detection region and disposed on a back surface of a front plate, a plurality of electrodes provided in the detection region, and a decorative layer having translucency and provided at a position overlapping the detection region and the parallax barrier.

BRIEF DESCRIPTION OF THE DRAWINGS

FIG. 11 is a sectional view schematically illustrating the detection system according to a third modification of a third embodiment.

DETAILED DESCRIPTION

Figure 1:
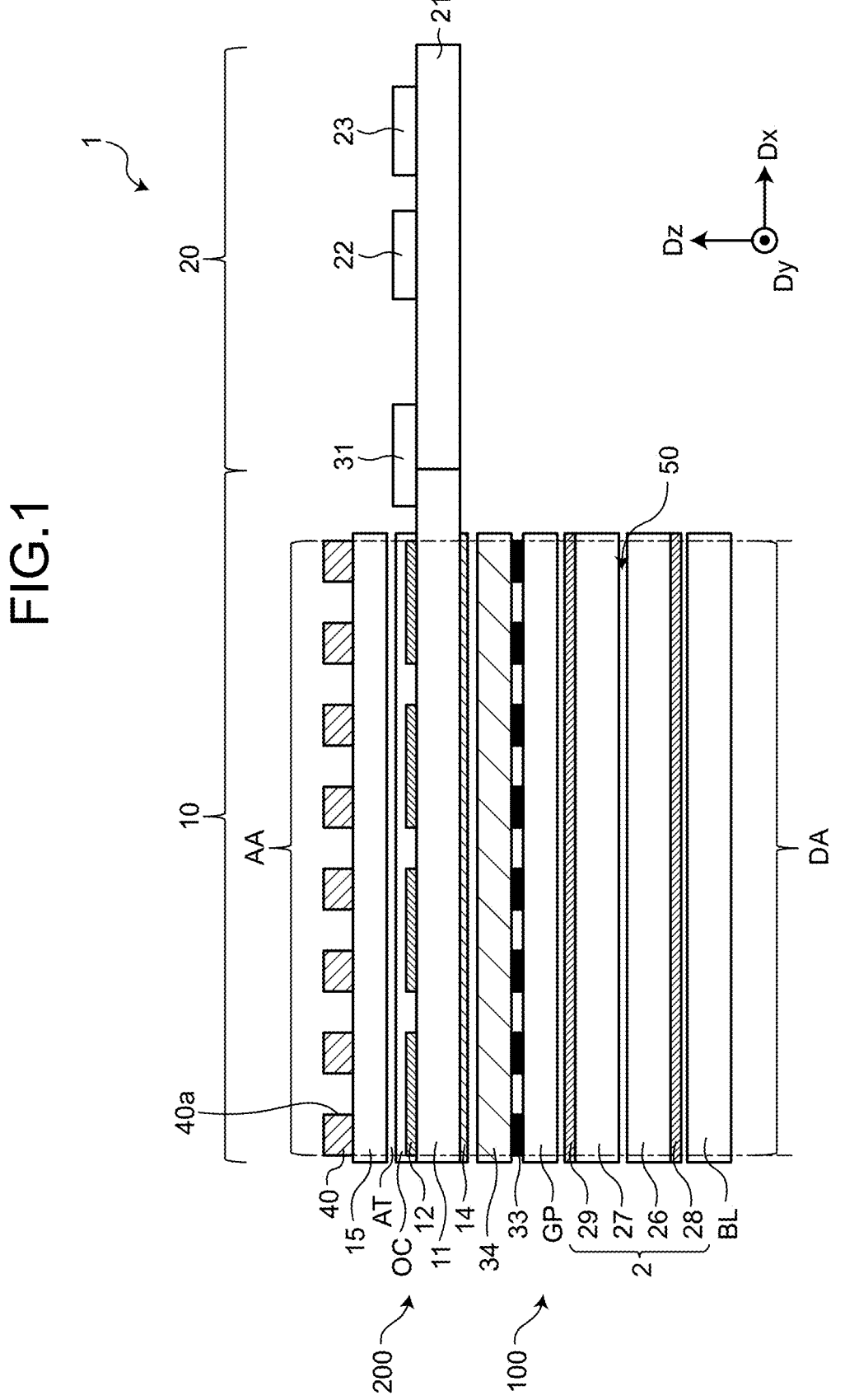
FIG. 1 is a sectional view schematically illustrating a detection system according to a first embodiment.

Exemplary aspects (embodiments) to embody the present disclosure are described below in greater detail with reference to the accompanying drawings. The contents described in the first embodiment below are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To make the explanation more specific, the drawings may possibly illustrate the width, the thickness, the shape, and other elements of each component more schematically than the actual aspect. These elements, however, are given by way of example only and are not intended to limit interpretation of the present disclosure. In the present specification and the drawings, components similar to those previously described with reference to previous drawings are denoted by like reference numerals, and detailed explanation thereof may be omitted as appropriate.

First Embodiment

FIG. 1 is a sectional view schematically illustrating a detection system according to a first embodiment. As illustrated in FIG. 1, a detection system 1 includes a display device 100, a parallax barrier 33, a shield layer 14, and a detection device 200. In the detection system 1, the display device 100, the parallax barrier 33, the shield layer 14, and the detection device 200 are stacked in this order.

The display device 100 includes a display panel 2 and a backlight BL. In plan view, a detection region AA of the detection device 200 and a display region DA of the display device 100 are disposed overlapping in a Dz direction.

The display device 100 is disposed facing a sensor region 10 of the detection device 200 in a third direction Dz with a gap adjustment layer GP interposed therebetween.

The backlight BL is a lighting device that may include a light guide plate and light-emitting diodes (LEDs). The backlight BL outputs light for image display and makes the light incident on the back surface of the display panel 2.

The display panel 2 is a liquid crystal display (LCD) panel including liquid crystal elements as display elements. The display panel 2 displays an image by transmitting light incident from the backlight BL. The display panel 2 performs gradation display on each pixel of the image by changing the light transmittance for each pixel provided to the display panel 2.

The display panel 2 is not limited to a liquid crystal display device and may be a self-emissive display panel, such as organic EL including organic light-emitting diodes (OLEDs) as display elements and micro-LED (μLED).

As illustrated in FIG. 1, the display panel 2 includes a first translucent base material 26, a second translucent base material 27, a polarizing plate 28, and a polarizing plate 29. In the display panel 2, the polarizing plate 28, the first translucent base material 26, the second translucent base material 27, and the polarizing plate 29 are stacked in this order. One direction on the plane of the display panel 2 is referred to as a first direction Dx, a direction orthogonal to the first direction Dx is referred to as a second direction Dy, and a direction orthogonal to the Dx-Dy plane is referred to as the third direction Dz.

The first translucent base material 26 and the second translucent base material 27 are provided facing each other between the polarizing plates 28 and 29 disposed facing each other. A liquid crystal layer 50 is sealed between the first translucent base material 26 and the second translucent base material 27.

The first translucent base material 26 and the second translucent base material 27 are made of, for example, glass or translucent resin, such as polyethylene terephthalate.

The surface of the second translucent base material 27 facing the liquid crystal layer 50 is provided with color filters and counter electrodes for the respective pixels. In particular, the regions of the respective pixels on the second translucent base material 27 are provided with color filters of the colors of R, G, and B. The surface of the first translucent base material 26 facing the liquid crystal layer 50 is provided with pixel electrodes and thin-film transistors (TFTs) serving as drive elements for the respective pixels.

The gap adjustment layer GP is provided between the display panel 2 and the parallax barrier 33. The gap adjustment layer GP is made of glass or translucent resin.

The parallax barrier 33 is disposed on the gap adjustment layer GP in the third direction Dz. A transparent substrate 34 is stacked on the parallax barrier 33 in the third direction Dz. The transparent substrate 34 is a translucent substrate made of glass or optical resin, for example.

The parallax barrier 33 has a light-blocking property and functions as a parallax barrier. The parallax barrier 33 is a metal film made of chromium (Cr), aluminum (Al), silver (Ag), or nickel (Ni), for example.

To display a stereoscopic image, the parallax barrier 33 optically separates the images for a left eye E1 and a right eye E2 by blocking part of the light incident from the display panel 2 and transmitting the remaining part. To display a plane image, the parallax barrier 33 transmits light incident from the display panel 2 without any change.

The shield layer 14 is provided on the back surface of the detection device 200. The shield layer 14 can block electromagnetic waves reaching the detection device 200 from the side on the back surface of the detection device 200. The shield layer 14 is disposed overlapping the detection region AA of the sensor region 10 in the third direction Dz in plan view.

The shield layer 14 is a translucent conductive layer. Electrodes 12 are provided to a second surface opposite to a first surface of a sensor substrate 11.

The detection device 200 includes the sensor substrate 11, the electrodes 12, a front plate 15, and a decorative layer 40. In the detection device 200, the sensor substrate 11, the electrodes 12, the front plate 15, and the decorative layer 40 are stacked in this order. The sensor substrate 11 is a translucent substrate made of glass or resin, for example. A plurality of electrodes 12 are formed on the sensor substrate 11. A protective layer OC covers the electrodes 12 to flatten the surface and protect the electrodes 12. The protective layer OC is made of translucent resin, such as acrylic resin. The protective layer OC may be made of organic resin or inorganic resin or may be a multilayered structure of organic resin and inorganic resin.

The front plate 15 is a protective panel that protects the front surface of the detection device 200. The front plate 15 is a glass substrate, for example, and is also called a cover glass. The front plate 15 is stacked on the protective layer OC in the third direction Dz. The protective layer OC is fixed to the front plate 15 with an adhesive layer AT interposed therebetween. The adhesive layer AT is a translucent adhesive that is called an optical clear adhesive (OCA). The adhesive layer AT may be a translucent film with double-sided adhesion.

In the detection region AA, the decorative layer 40 is stacked on the surface side of the front plate 15 in the third direction Dz. The decorative layer 40 is a translucent transflective layer and is a colored layer with lower light transmittance than the front plate 15. The decorative layer 40 is a film with a wood-grain pattern, for example.

The decorative layer 40 is not limited to a single layer and may be a multilayered structure of a plurality of layers. The surface of the decorative layer 40 provided to the top layer is referred to as a "detection surface". The decorative layer 40 has a plurality of openings 40a through the decorative layer 40 in the third direction Dz. A light-shielding layer made of black resin or metal material may be provided under the decorative layer 40.

The decorative layer 40 can prevent the wiring, circuits, and other components stacked under the decorative layer 40 and provided overlapping the detection region AA from being visually recognized by an observer.

All of the shield layer 14, the sensor substrate 11, the protective layer OC, the adhesive layer AT, the electrodes 12, the front plate 15, and the decorative layer 40 are translucent. Therefore, light IL1 or light IR1 output from the display device 100 can reach the left eye E1 or the right eye E2 of the observer.

Figure 2:
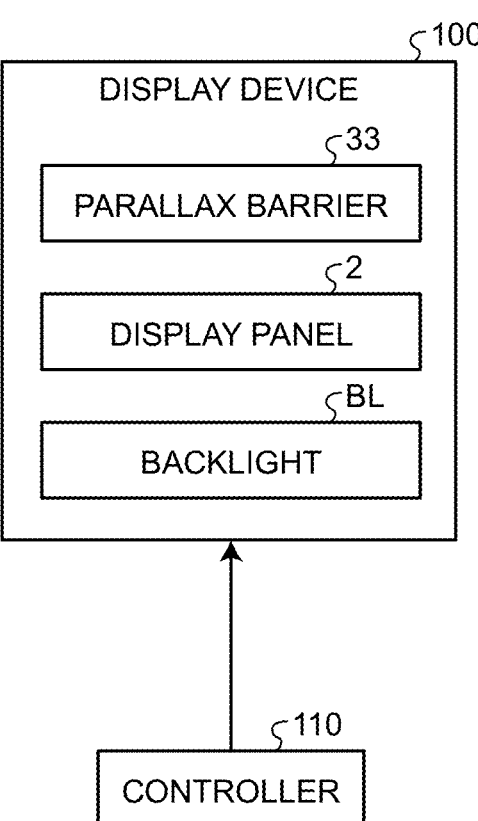
FIG. 2 is a diagram of a configuration example of a display device according to the first embodiment.

FIG. 2 is a diagram of a configuration example of the display device according to the first embodiment. As illustrated in FIG. 2, the display device 100 further includes a controller 110.

The controller 110 controls the display device 100. For example, the controller 110 drives a display driver (not illustrated) of the display device 100, thereby causing the display panel 2 to display an image and causing the backlight BL to output light.

Figure 3:
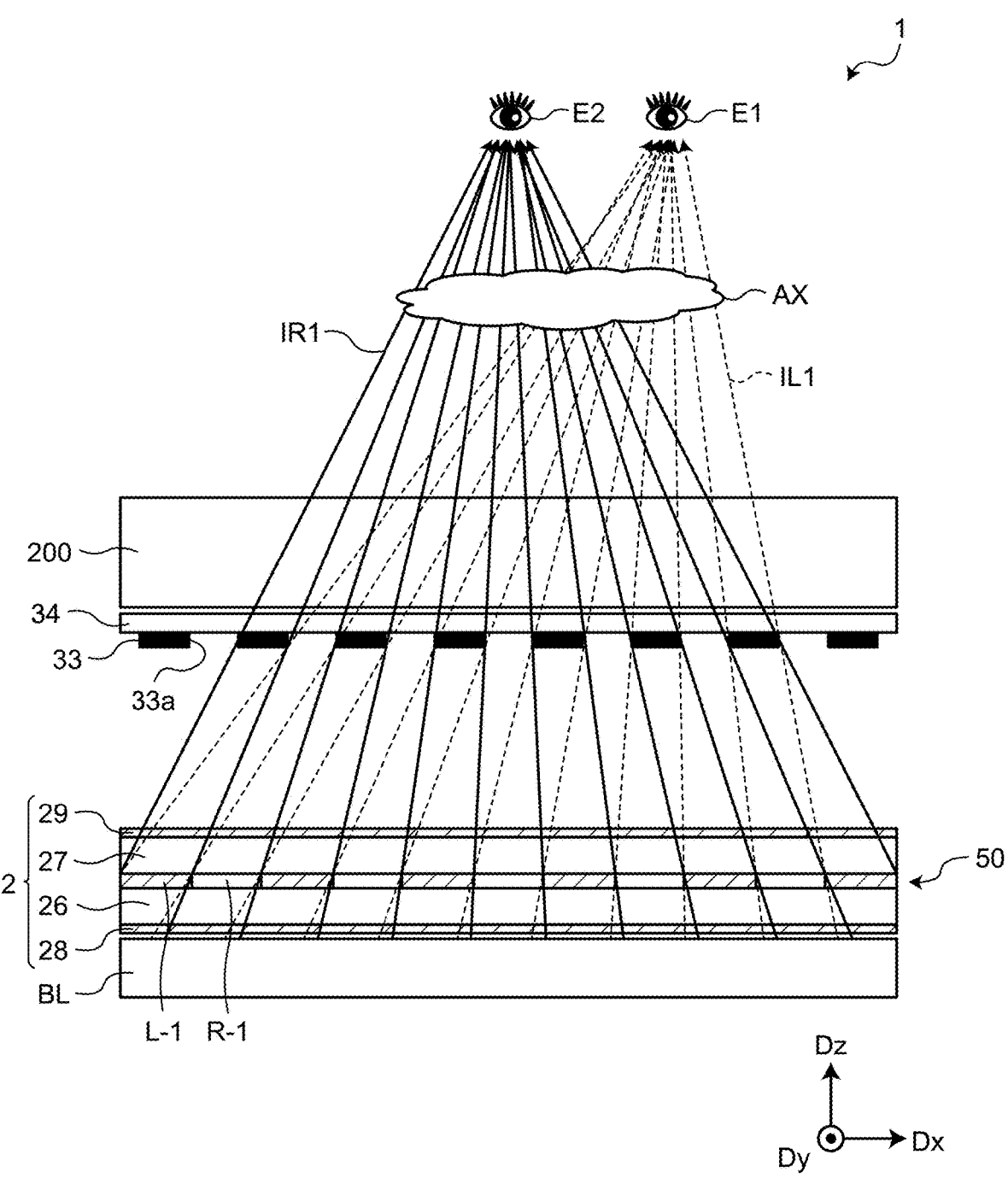
FIG. 3 is a plan view for explaining three-dimensional display of the detection system according to the first embodiment.

FIG. 3 is a plan view for explaining three-dimensional display of the detection system according to the first embodiment. FIG. 3 illustrates the principle of separation of parallax video by the parallax barrier 33. As illustrated in FIG. 3, the liquid crystal layer 50 alternately displays a left-eye image L-1 and a right-eye image R-1 column by column to display a stereoscopic image. The left-eye image L-1 is an image for transmitting light to display an image for the left eye. The right-eye image R-1 is an image for transmitting light to display an image for the right eye. The parallax barrier 33 has a plurality of openings 33a through the parallax barrier 33 in the third direction Dz. The openings 33a are arrayed at predetermined intervals in the first direction Dx such that the openings 33a extend in the second direction Dy.

The light IL1 passing through openings 13a of the parallax barrier 33 out of the light output from the display panel 2 and linearly polarized by the polarizing plate 29 reaches the observer's left eye E1 through the openings 33a and the transparent substrate 34. By contrast, the light IL1 incident on the parallax barrier 33 out of the light output from the display panel 2 and linearly polarized by a polarizing plate 61 is blocked by the parallax barrier 33. The observer's left eye E1 observes the left eye image L-1 through the openings 33a of the parallax barrier 33, and the observer's right eye E2 observes the right eye image R-1 through the openings 33a of the parallax barrier 33.

The distance between the display panel 2 and the parallax barrier 33 is adjusted to prevent the observer's left eye E1 (right eye E2) from visually recognizing the right eye image R-1 (left eye image L-1). As a result, the observer can observe a display object AX (stereoscopic image) as if it were floating.

Figure 4:
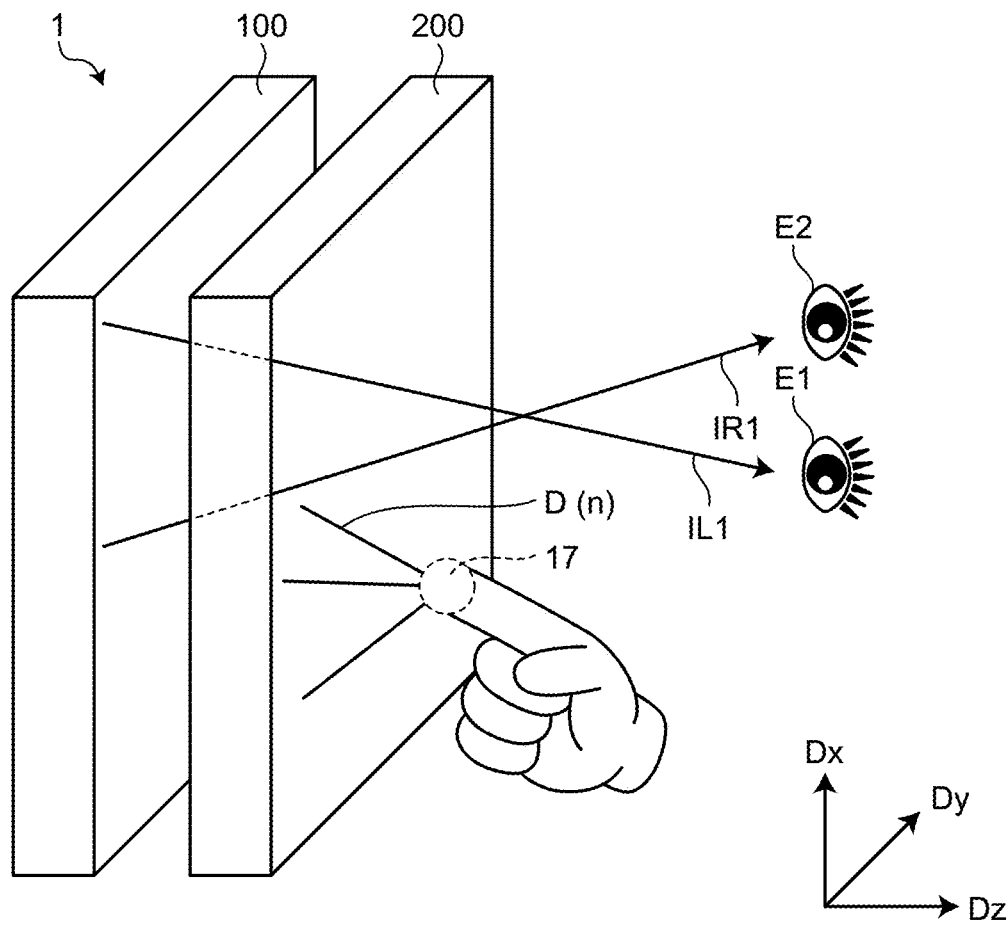
FIG. 4 is a perspective view of a schematic configuration of the detection system according to the first embodiment.

FIG. 4 is a perspective view of a schematic configuration of the detection system according to the first embodiment. As illustrated in FIG. 4, the detection device 200 is a sensor that detects an object to be detected 17. The detection device 200 can detect capacitance corresponding to the distance D(n) between the object to be detected 17 and the detection device 200 or the spatial coordinates.

In the detection system 1, when the display device 100 displays an image and the light IL and the light IR pass through the detection device 200, the light IL (light IR) can reach the observer's left eye E1 (right eye E2).

Figure 5A:
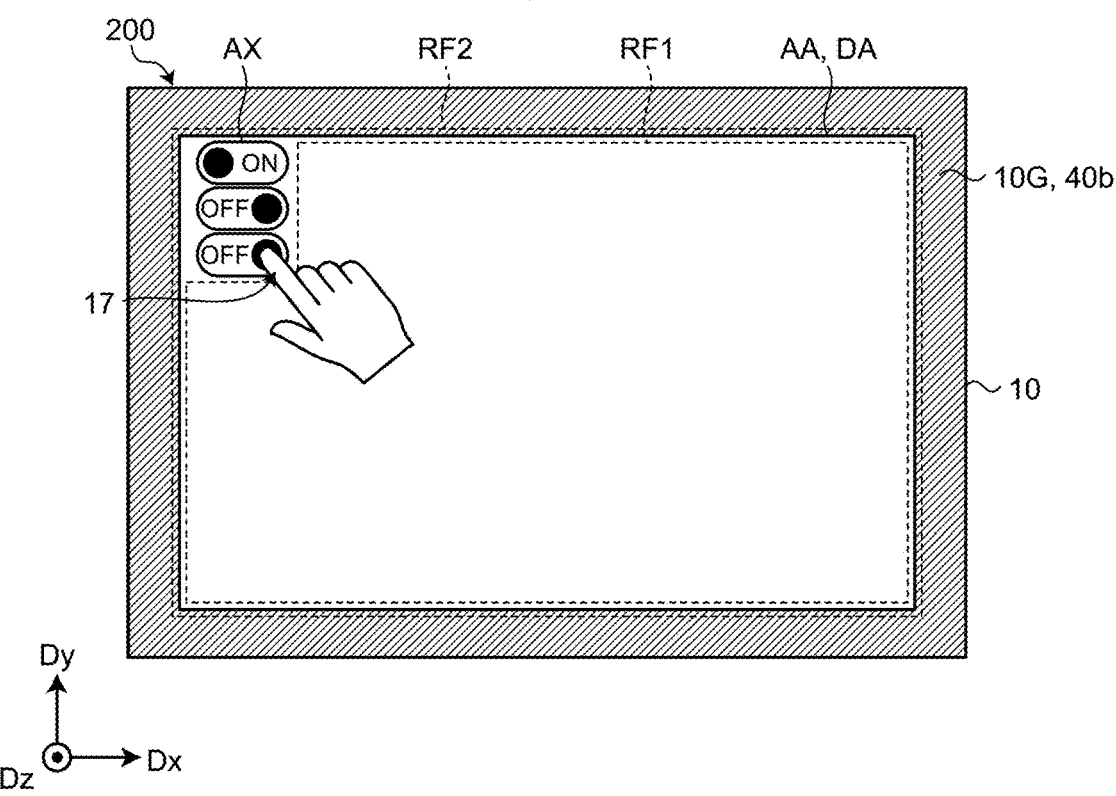
FIG. 5A is a plan view for explaining a detection region of a detection device when the display device according to the first embodiment is in a display state.
Figure 5B:
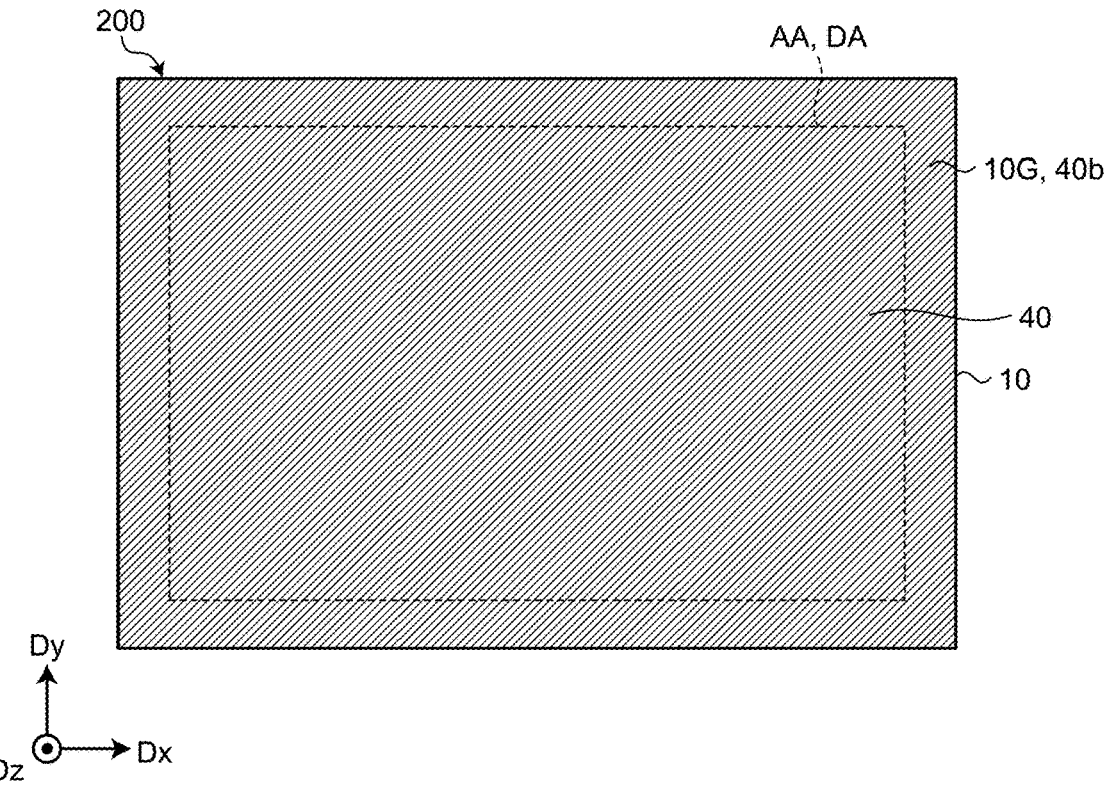
FIG. 5B is a plan view for explaining the detection region of the detection device when the display device according to the first embodiment is a non-display state.

FIG. 5A is a plan view for explaining the detection region of the detection device when the display device according to the first embodiment is in a display state. FIG. 5B is a plan view for explaining the detection region of the detection device when the display device according to the first embodiment is a non-display state.

As illustrated in FIG. 5A, the detection device 200 is attached to a support member 10G. The support member 10G surrounds and supports the display region DA that displays the display object AX, and also the detection region AA that can detect the object to be detected 17, when viewed in the third direction Dz in plan view. The detection region AA and the display region DA overlap in the third direction Dz.

An opening is formed at the center of the support member 10G along the third direction Dz. The detection region AA of the detection device 200 and the display region DA are fitted into the opening. The surface of the support member 10G is covered by a decorative layer 40b identical to the decorative layer 40.

As illustrated in FIG. 5A, the display object AX serving as buttons can be displayed on the detection region AA by transmitting the light IL1 or the light IR1 from the display device 100. In the region on which the light IL1 or the light IR1 is not incident from the display device 100, the pattern of the decorative layer 40 in the display region DA is not visually recognized. A first region RF1 is a region other than the region where the display object AX serving as the buttons is displayed by the light IL1 or the light IR1 of the image from the detection system 1, for example.

When the light IL1 or the light IR1 of the image from the display device 100 is not incident from the back surface of the detection device 200, the display object AX serving as the buttons disappears, and the entire display region DA becomes a second region RF2 where the pattern of the decorative layer 40 is visible. As illustrated in FIG. 5B, it is difficult for the observer to recognize the boundary between the decorative layer 40b on the surface of the support member 10G and the decorative layer 40 on the top layer of the detection region AA and the display region DA, thus making the external shape of the display panel 2 itself invisible.

When the light IL1 or the light IR1 of the image from the display device 100 is incident from the back surface of the detection device 200 in a state where the second region RF2 is present, the light IL1 or the light IR1 of the image from the display device 100 is visually recognized by the left eye E1 or the right eye E2 of the observer as the display object AX as if it floated up from the pattern of the decorative layer 40. At this time, the observer visually recognizes the display object AX in the detection region AA.

Therefore, when an input operation is performed on the same coordinates as those of the display object AX with the finger serving as the object to be detected 17, the detection device 200 can detect that the object to be detected 17 is present at the spatial coordinates of the display object AX. Detecting the position of the object to be detected 17 in a non-contact state may be referred to as hover detection. If the display object AX is displayed in two dimensions (2D display), the detection device 200 may detect a touch position at which the object to be detected 17 is in contact with the detection surface of the detection device 200. Alternatively, if the display object AX is displayed in two dimensions (2D display), the detection device 200 may detect a coordinate position on the Dx-Dy plane of the object to be detected 17 not in contact with the detection surface of the detection device 200.

Figure 6:
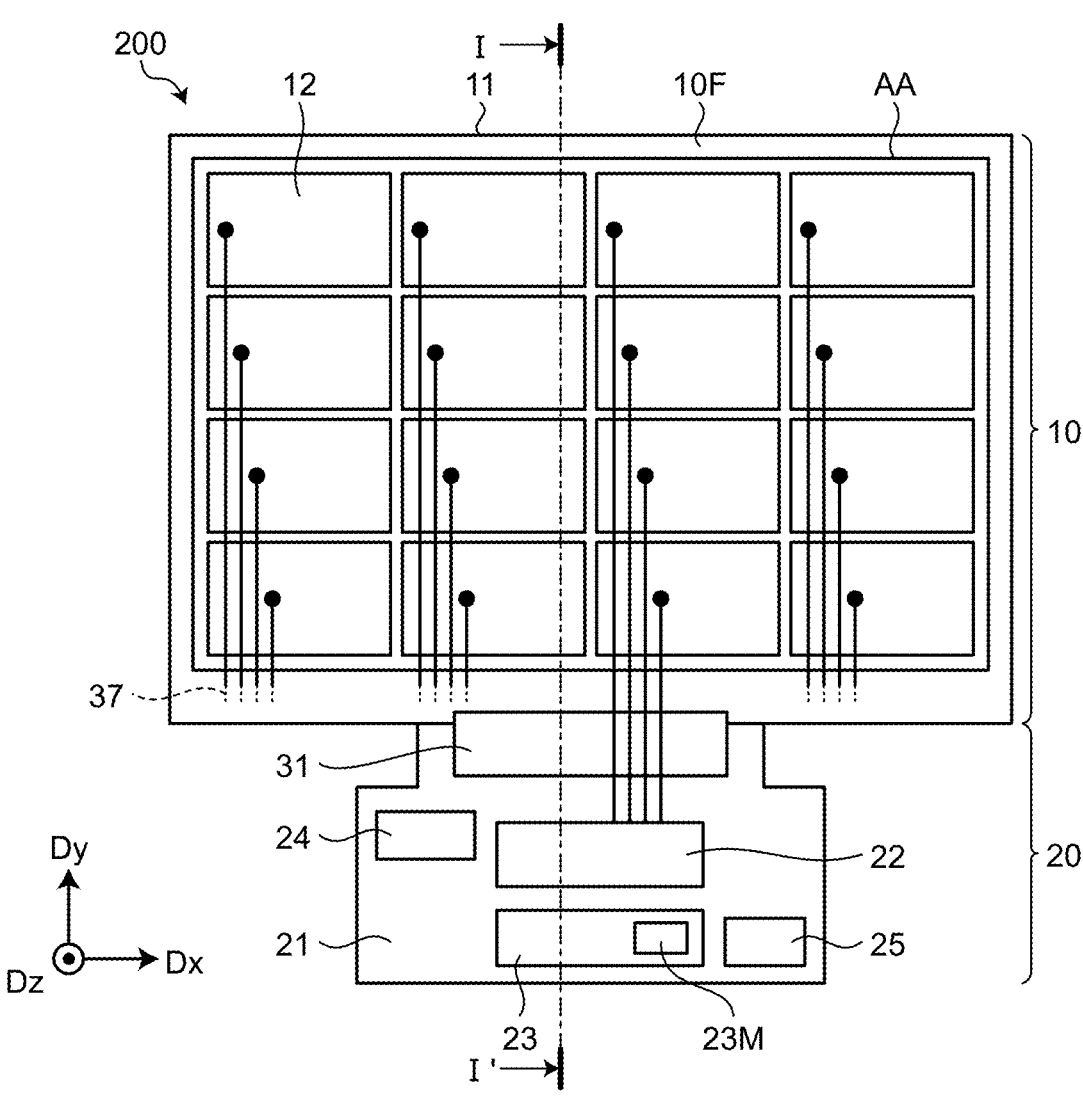
FIG. 6 is a plan view of a schematic configuration of the detection device according to the first embodiment.

FIG. 6 is a plan view of a schematic configuration of the detection device according to the first embodiment. As illustrated in FIG. 6, the detection device 200 includes the sensor region 10 and a control circuit 20. The detection device 1 has the detection region AA in which the object to be detected 17 can be detected and a frame region 10F surrounding the detection region when viewed in the Dz direction. The detection device 200 is a sensor that detects the object to be detected 17.

The sensor region 10 includes the sensor substrate 11, a plurality of electrodes 12 provided to the detection region AA of the sensor substrate 11, and wiring 37 extending from the electrodes 12. The control circuit 20 includes a control substrate 21, an analog front end (AFE) circuit 22, a processing circuit 23, a power supply circuit 24, and an interface circuit 25.

The detection region AA of the sensor substrate 11 is a region provided with a plurality of electrodes 12 arrayed in a matrix (row-column configuration) in the first direction Dx and the second direction Dy. The sensor substrate 11 is a glass substrate or translucent flexible printed circuits (FPC), for example.

While FIG. 6 illustrates an example where 4×4 (=16) electrodes 12 with four electrodes 12 in the first direction Dx and four electrodes 12 in the second direction Dy are provided, the number of electrodes 12 provided to the detection region AA of the sensor substrate 11 is not limited thereto.

The electrode 12 is made of translucent conductive material (translucent conductive oxide), such as indium tin oxide (ITO). The electrode 12 has such translucency that it transmits at least part of incident light IL illustrated in FIG. 1.

As illustrated in FIG. 6, the sensor substrate 11 is electrically coupled to the control substrate 21 via a wiring substrate 31. The wiring substrate 31 is flexible printed circuits, for example. Each electrode 12 of the sensor region 10 is coupled to the wiring 37 and to an AFE circuit 220 of the control circuit 20 via the wiring substrate 31.

The control substrate 21 is provided with the AFE circuit 220, a processing circuit 230, the power supply circuit 24, and the interface circuit 25. The control substrate 21 is a rigid substrate, for example.

The AFE circuit 220 generates a detection value of each electrode 12 based on detection a signal of the electrode 12 output from the sensor substrate 11. The AFE circuit 220 is an analog front-end IC, for example.

The processing circuit 230 generates the spatial coordinates indicating the position where an object to be detected (e.g., operator's finger) is present on the detection region AA based on the detection values of the electrodes 12 output from the AFE circuit 220. The processing circuit 230 may be a programmable logic device (PLD), such as a field programmable gate array (FPGA), or a micro control unit (MCU), for example. The processing circuit 230 includes a memory 23M.

The memory 23M stores therein, for the processing circuit 230, the criteria for determining whether the object to be detected 17 is present in the detection region and the thresholds serving as the criteria for determining detection of an input operation by an operator.

The power supply circuit 24 is a circuit that supplies power to the AFE circuit 220 and the processing circuit 230.

The interface circuit 25 is a USB controller IC, for example, and is a circuit that controls communications between the processing circuit 230 and a host controller (not illustrated) of a host device on which the detection system is mounted.

Figure 7:
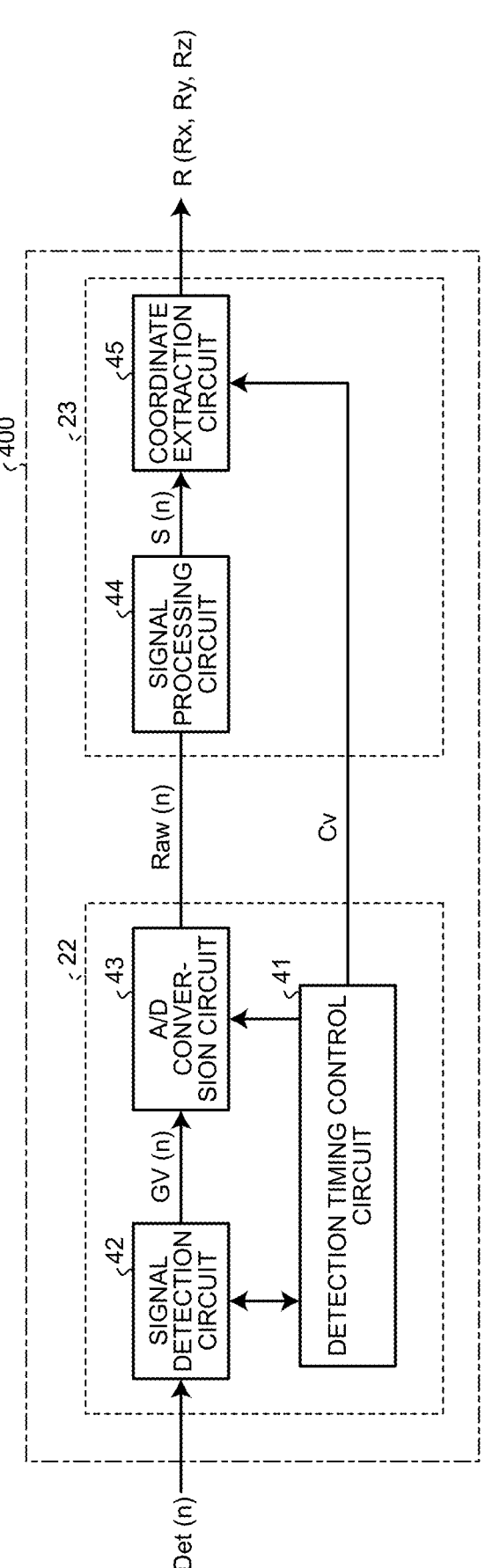
FIG. 7 is a block diagram of a configuration example of a detection circuit of the detection device according to the first embodiment.

FIG. 7 is a block diagram of a configuration example of a detection circuit of the detection device according to the first embodiment. A detection circuit 400 according to the present disclosure detects the object to be detected 17 in the space on the detection region AA. As illustrated in FIG. 7, the detection circuit 400 includes a detection timing control circuit 41, a signal detection circuit 42, an A/D conversion circuit 43, a signal processing circuit 44, and a coordinate extraction circuit 45. The detection timing control circuit 41, the signal detection circuit 42, and the A/D conversion circuit 43 according to the present disclosure are included in the AFE circuit 220. The signal processing circuit 44 and the coordinate extraction circuit 45 are included in the processing circuit 230.

The detection timing control circuit 41 is a component that controls the timing of detection operations in the signal detection circuit 42 and the A/D conversion circuit 43.

The signal detection circuit 42 generates an output value GV(n) of each electrode 12 based on a detection signal Det (n) of the electrode 12 output from the sensor substrate 11 (n is a natural number from 1 to N, where N is the number of electrodes in the detection region AA). The A/D conversion circuit 43 samples the output value GV(n) output from the signal detection circuit 42 and converts it into a discrete detection value Raw(n).

The signal processing circuit 44 performs predetermined signal processing on the detection value Raw(n) of each electrode 12 and calculates a signal value S(n) of each electrode 12.

The coordinate extraction circuit 45 calculates spatial coordinates R (Rx, Ry, Rz) of the position where the object to be detected is present based on the signal values S(n) of the respective electrodes 12 output from the signal processing circuit 44.

Figure 8A:
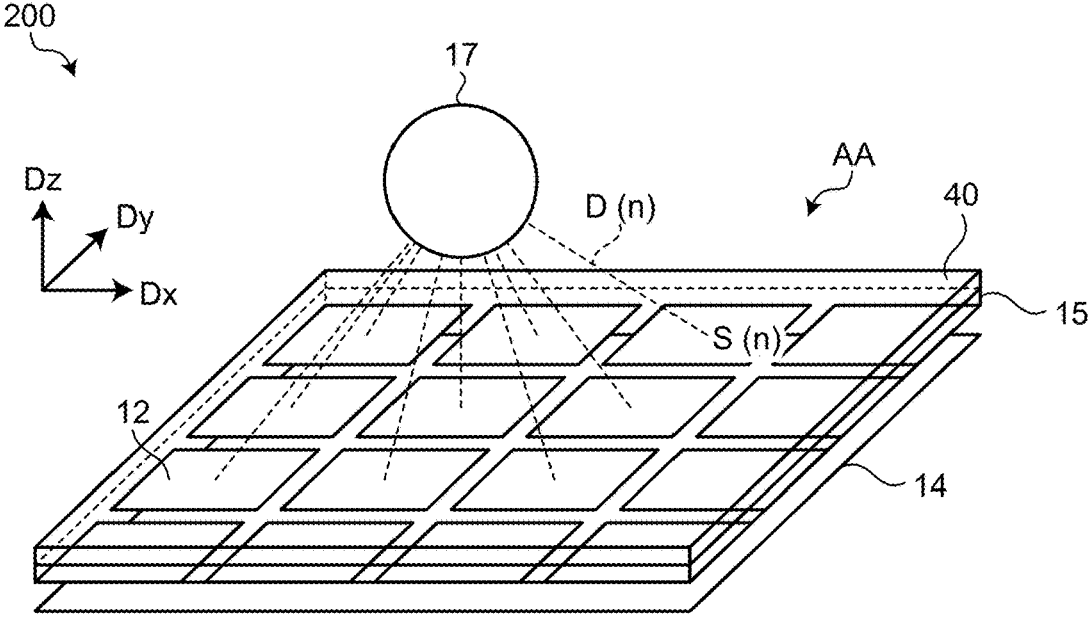
FIG. 8A is a schematic of the relation between the position of an object to be detected in a space on the detection region and the positions of respective electrodes.

FIG. 8A is a schematic of the relation between the position of the object to be detected in the space on the detection surface and the positions of the respective electrodes. As illustrated in FIG. 8A, each electrode 12 in the detection region AA generates capacitance corresponding to a distance D(n) between the object to be detected 17 present on the detection surface and the electrode 12, and the signal value S(n) corresponding to the capacitance is obtained.

As illustrated in FIG. 8A, each electrode 12 in the detection region AA generates capacitance corresponding to a distance D(n) between the object to be detected 17 present on the detection surface and the electrode 12, and the signal value S(n) corresponding to the capacitance is obtained.

Figure 8B:
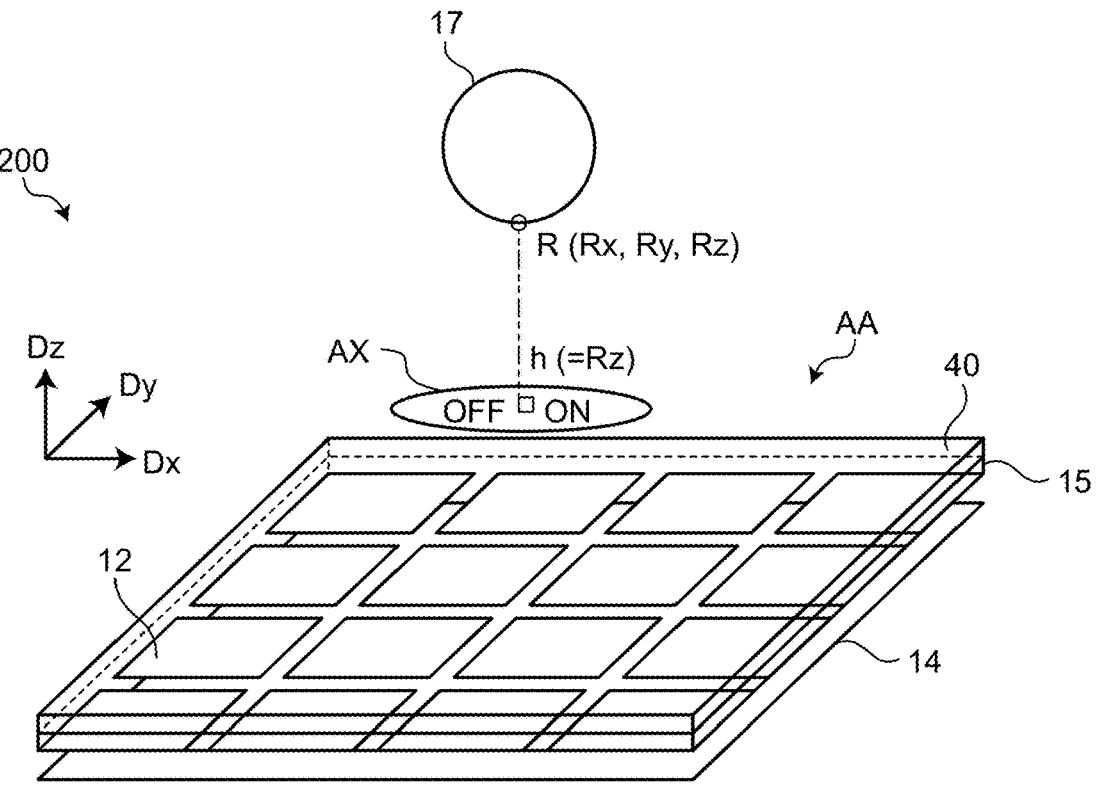
FIG. 8B is a schematic of the spatial coordinates of the object to be detected in the space on the detection region.

FIG. 8B is a schematic of the spatial coordinates of the object to be detected on the detection surface. The processing circuit 230 extracts the spatial coordinates R (Rx, Ry, Rz) indicating the position of the object to be detected F on the detection region AA illustrated in FIG. 8B using the generated signal values S(n) of the electrodes 12.

FIGS. 8A and 8B illustrate an example where the object to be detected 17 is present on the detection surface.

The spatial coordinates R (Rx, Ry, Rz) according to the present disclosure include first data Rx indicating the position in the first direction Dx on the detection region AA, second data Ry indicating the position in the second direction Dy on the detection region AA, and third data Rz indicating the position in the third direction Dz orthogonal to the first direction Dx and the second direction Dy.

The spatial coordinates R (Rx, Ry, Rz) according to the present disclosure indicate the position of the object to be detected 17 present on the detection surface with respect to the display object AX visually recognized as if it were floating when the surface of the front plate 15 is the detection surface.

As described above, the detection device 200 is configured to detect the spatial coordinates of the position where the object to be detected 17 is present on the detection region AA by detecting the capacitance generated in the electrodes 12.

First Modification of First Embodiment

Figure 9:
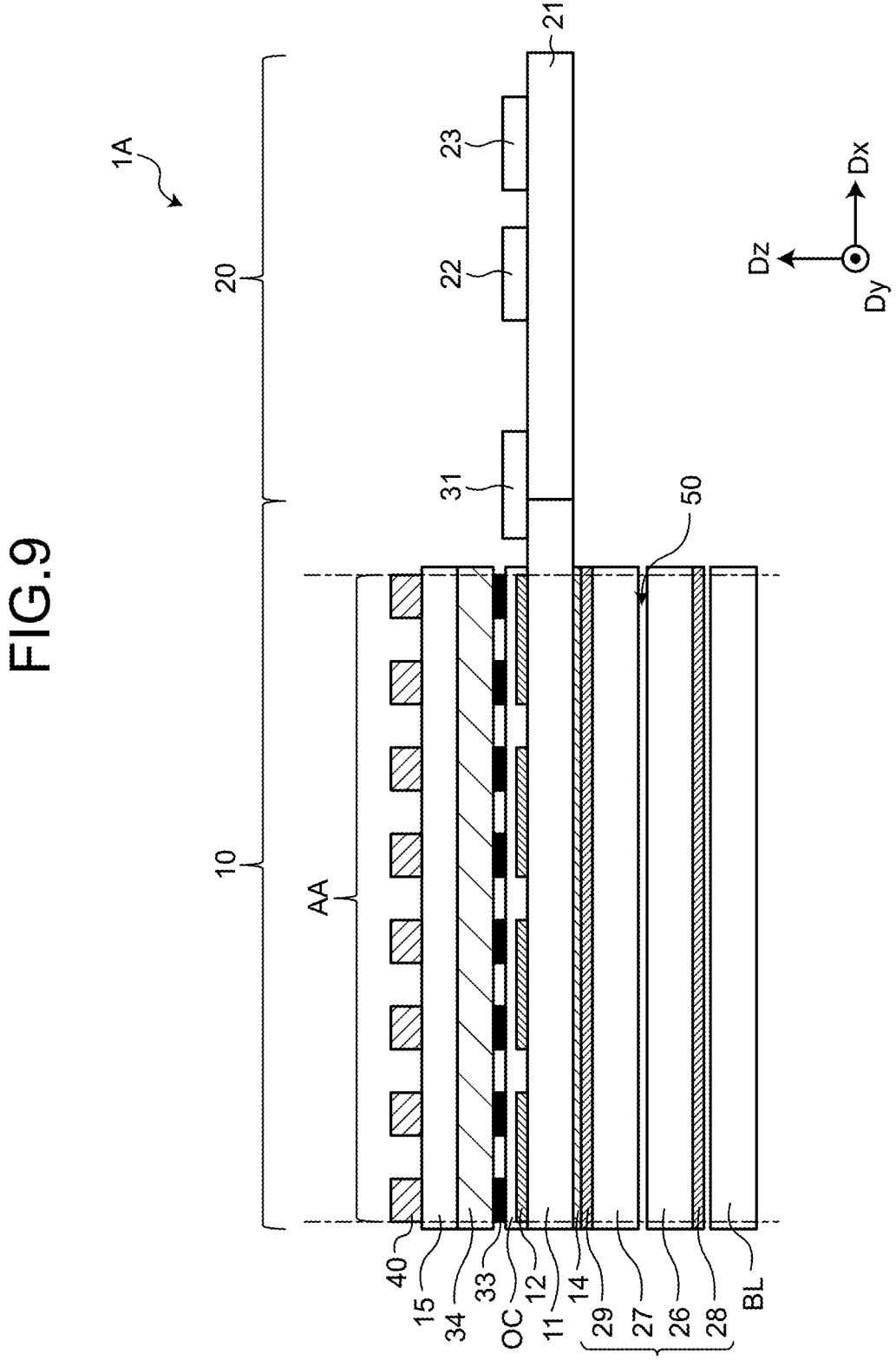
FIG. 9 is a sectional view schematically illustrating the detection system according to a first modification of the first embodiment.

FIG. 9 is a sectional view schematically illustrating the detection system according to a first modification of the first embodiment. In the following description, the same components as those described in the embodiment above are denoted by like reference numerals, and duplicate explanation thereof is omitted.

As illustrated in FIG. 9, a detection system 1A according to the first modification of the first embodiment includes the backlight BL, the display panel 2, the shield layer 14, the sensor substrate 11, the electrodes 12, the protective layer OC, the parallax barrier 33, the transparent substrate 34, the front plate 15, and the decorative layer 40 stacked in this order. The detection system 1A is different from the detection system 1 in that the shield layer 14 is disposed on the display panel 2 and that the parallax barrier 33 is disposed on the protective layer OC. The parallax barrier is provided between the transparent substrate 34 and the protective layer OC.

The detection system 1A has a gap (not illustrated) thick enough not to be affected by noise output from the display panel 2. The thickness of the gap is smaller than that of the gap adjustment layer GP in the detection system 1.

This configuration reduces the thickness of the entire detection system 1A, thereby suppressing reduction in luminance and improving the transmittance compared with the detection system 1.

*Second Modification of First Embodiment*

Figure 10:
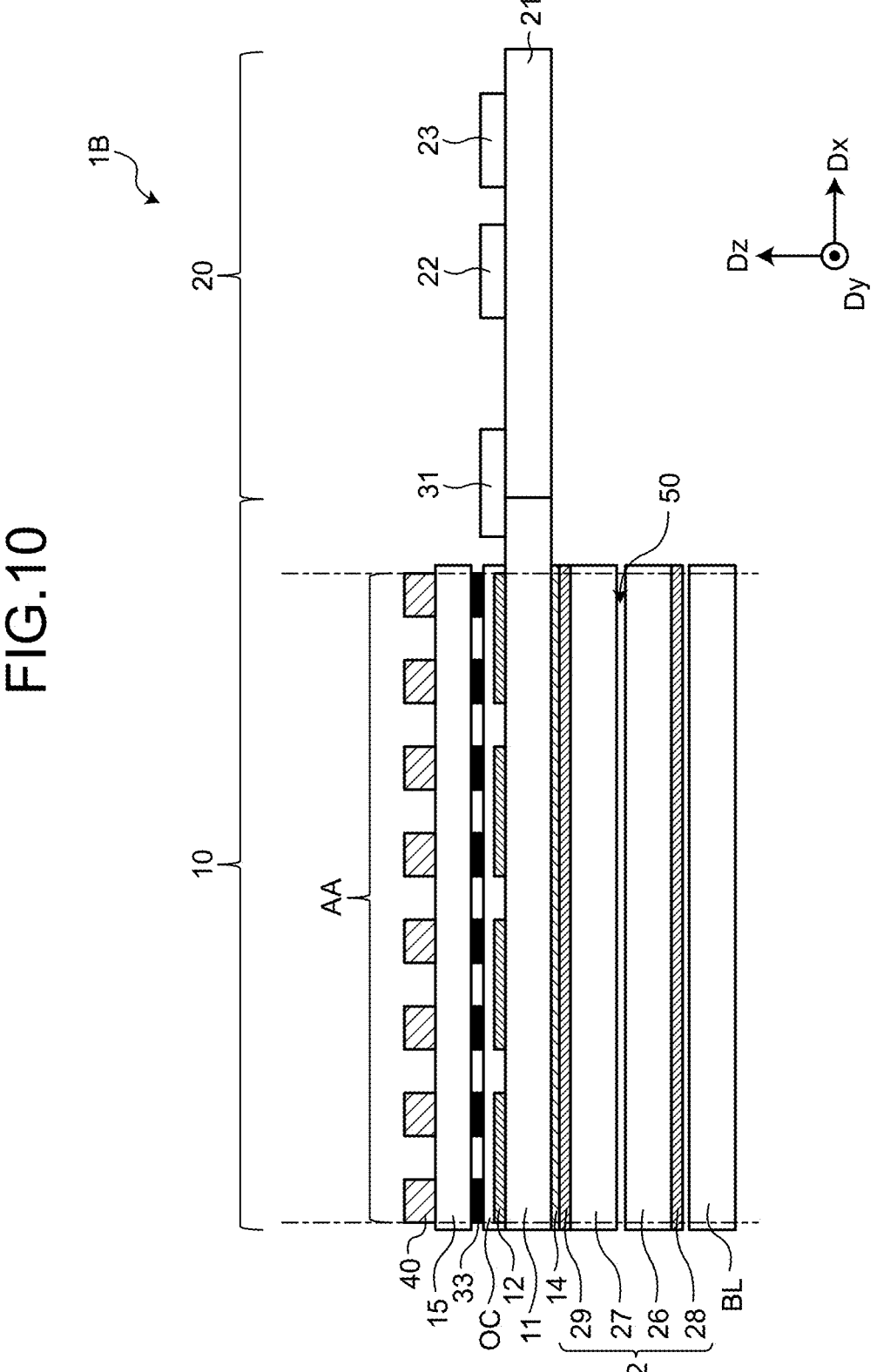
FIG. 10 is a sectional view schematically illustrating the detection system according to a second modification of a second embodiment.

FIG. 10 is a sectional view schematically illustrating the detection system according to a second modification of the first embodiment. In the following description, the same components as those described in the embodiment above are denoted by like reference numerals, and duplicate explanation thereof is omitted.

As illustrated in FIG. 10, a detection system 1B according to the second modification of the first embodiment includes the backlight BL, the display panel 2, the shield layer 14, the sensor substrate 11, the electrodes 12, the protective layer OC, the parallax barrier 33, the front plate 15, and the decorative layer 40 stacked in this order. The detection system 1B is different from the detection system 1A in that the transparent substrate 34 is not provided. The detection system 1B has a structure in which the protective layer OC and the front plate 15 are directly bonded together. The parallax barrier is provided between the front plate 15 and the protective layer OC.

This configuration makes the thickness of the entire detection system 1B smaller than that of the detection system 1A, thereby further suppressing reduction in luminance and improving the transmittance compared with the detection system 1A.

*Third Modification of First Embodiment*

Figure 11:
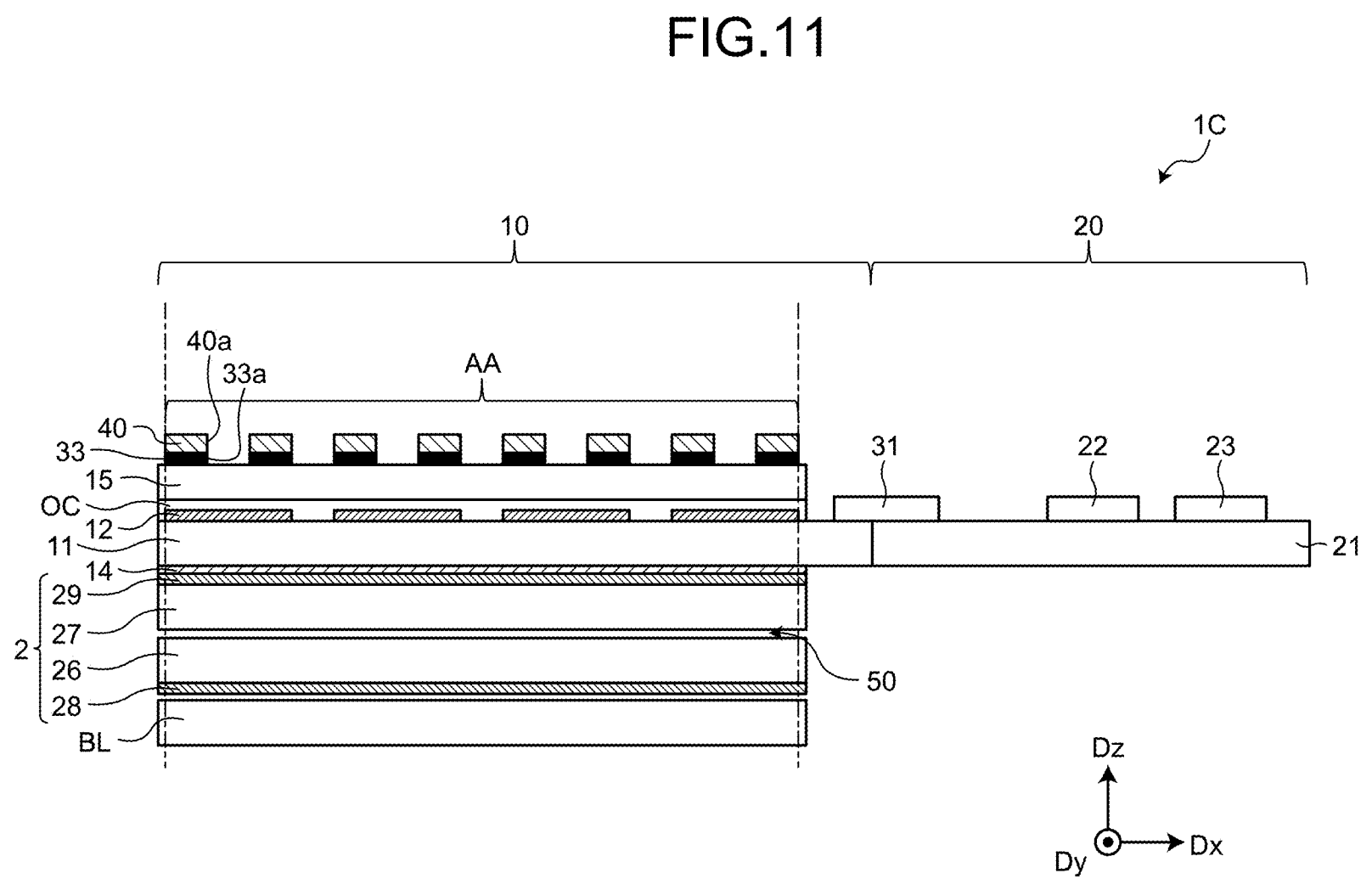

FIG. 11 is a sectional view schematically illustrating the detection system according to a third modification of the first embodiment. In the following description, the same components as those described in the embodiment above are denoted by like reference numerals, and duplicate explanation thereof is omitted.

As illustrated in FIG. 9, a detection system 1C according to the first modification of the first embodiment includes the backlight BL, the display panel 2, the shield layer 14, the sensor substrate 11, the electrodes 12, the protective layer OC, the front plate 15, the parallax barrier 33, and the decorative layer 40 stacked in this order. The detection system 1A is different from the detection system 1B in that the parallax barrier 33 is disposed between the front plate 15 and the decorative layer 40 and that the positions of the openings 40a of the decorative layer 40 overlap all or some of the positions of the openings 33a of the parallax barrier 33.

With this configuration, the openings 40a of the decorative layer 40 overlap the openings 33a of the parallax barrier 33, thereby further suppressing reduction in luminance and improving the transmittance compared with the detection system 1B.

While exemplary embodiments according to the present disclosure have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the present disclosure.

What is claimed is:

1. A detection system comprising:
a display panel configured to display an image in a display region using light from a back surface side;
a backlight configured to irradiate the display panel with light from the back surface side;
a parallax barrier having a plurality of openings and disposed at a position overlapping the display panel;
a sensor region having a detection region and disposed on a back surface of a front plate;
a plurality of electrodes provided in the detection region; and
a decorative layer that has translucency and that includes a plurality of openings through the decorative layer, the decorative layer being provided at a position overlapping the display region displaying the image, the detection region, and the parallax barrier, wherein
the display region including a first region and a second region,
in the first region on which light from the backlight is incident, a display object is displayed, and
in the second region on which light from the backlight is not incident, a pattern of the decorative layer is visible.

2. The detection system according to claim 1, wherein
a transparent substrate is provided between the decorative layer and the parallax barrier,
the electrodes are covered by a protective layer, and
the parallax barrier is provided between the transparent substrate and the protective layer.

3. The detection system according to claim 1, wherein
the electrodes are covered by a protective layer, and
the parallax barrier is provided between the front plate and the protective layer.

4. The detection system according to claim 3, wherein
the parallax barrier is disposed between the front plate and the decorative layer, and
the positions of the openings of the decorative layer overlap all or some of the positions of the openings of the parallax barrier.

* * * * *